July 3, 1923.

D. R. BOWEN ET AL 1,460,938

METHOD OF MIXING OR MASTICATING HEAVY PLASTIC MATERIAL

Original Filed Sept. 14, 1917   5 Sheets-Sheet 1

July 3, 1923.
D. R. BOWEN ET AL
1,460,938
METHOD OF MIXING OR MASTICATING HEAVY PLASTIC MATERIAL
Original Filed Sept. 14, 1917    5 Sheets-Sheet 3
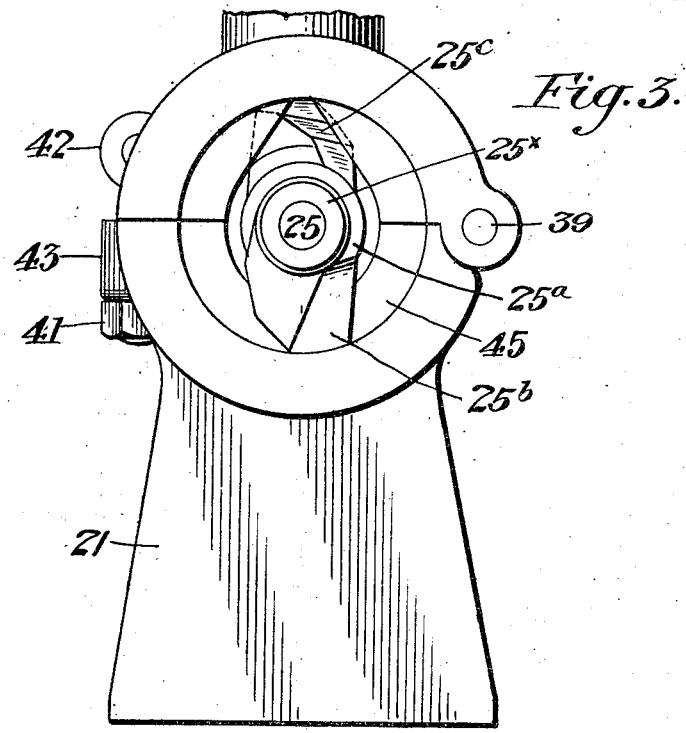
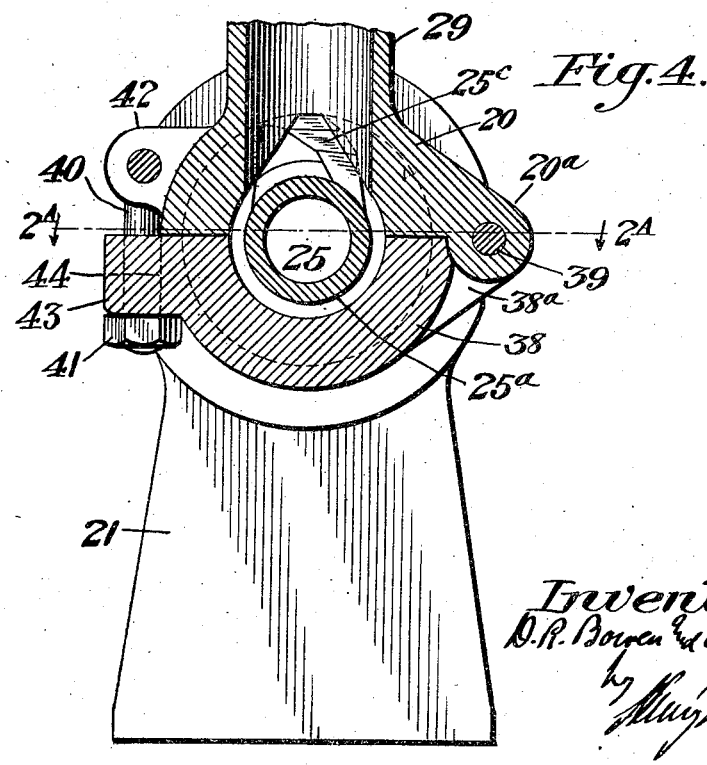
Inventors.
D. R. Bowen & C. F. Schnuck,
by
Attorney.

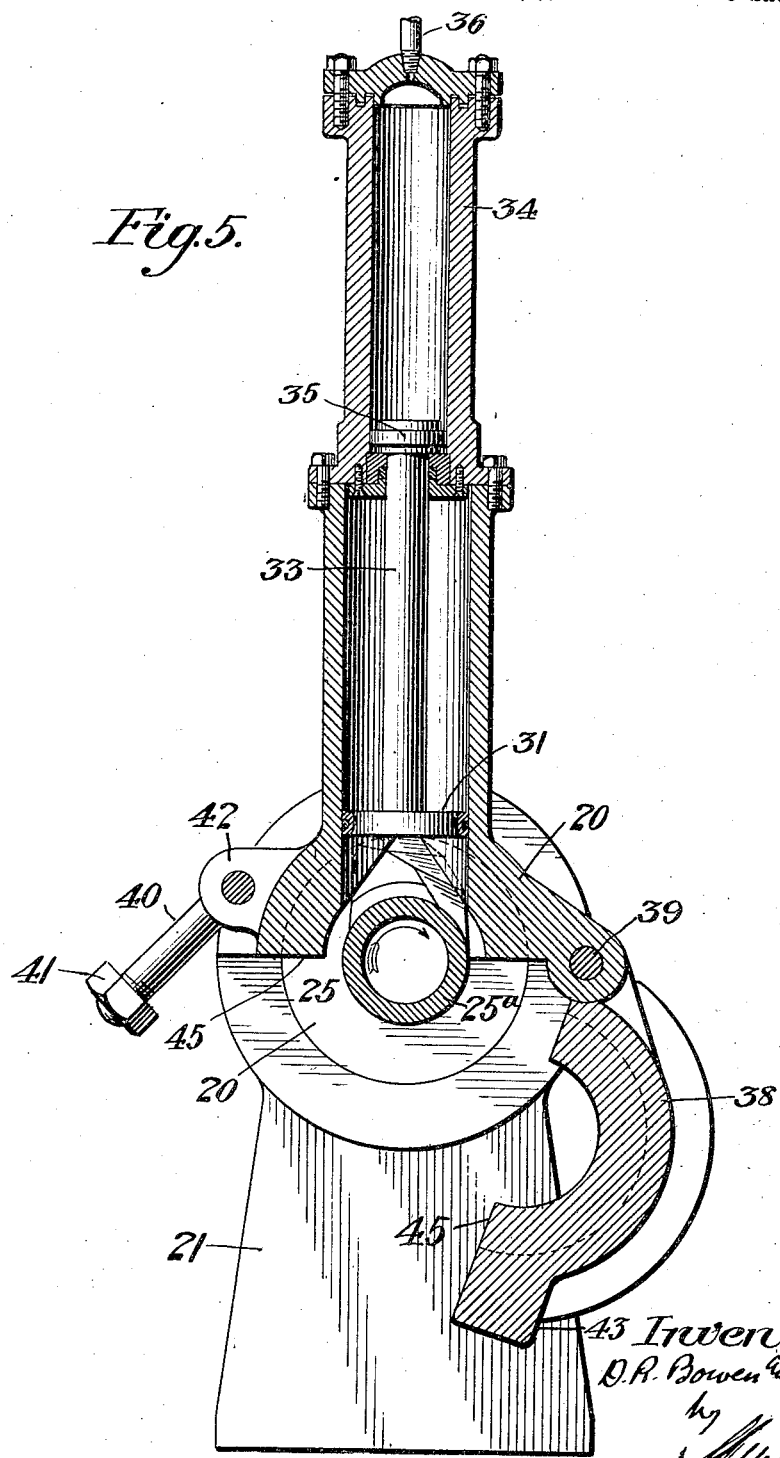

July 3, 1923. 1,460,938
D. R. BOWEN ET AL
METHOD OF MIXING OR MASTICATING HEAVY PLASTIC MATERIAL
Original Filed Sept. 14, 1917  5 Sheets-Sheet 5
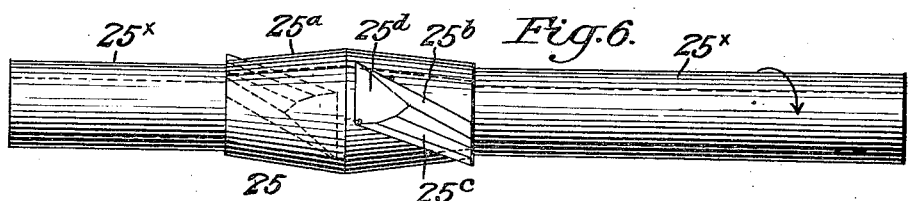
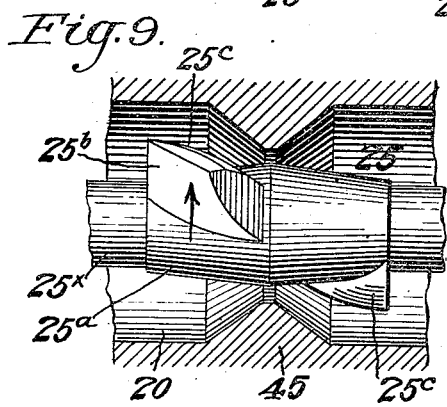
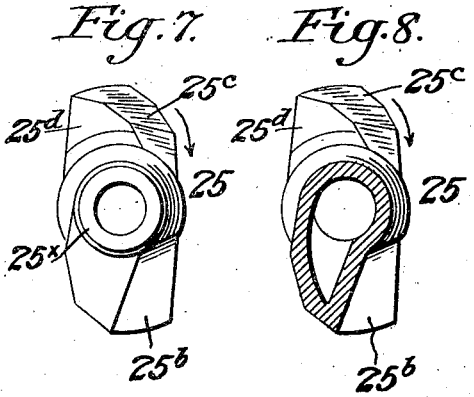
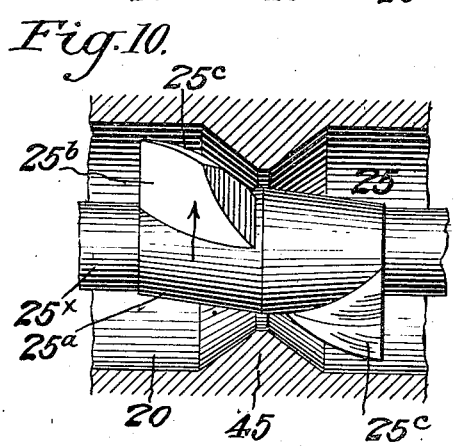
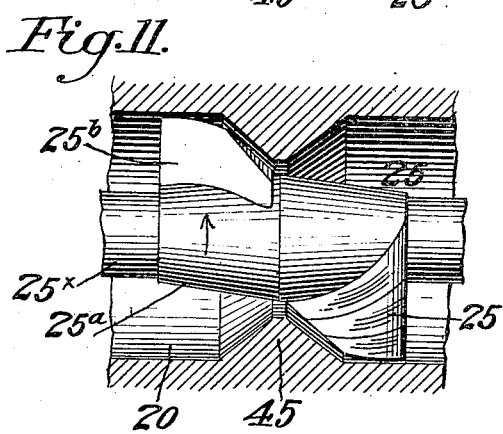
Inventors.
D. R. Bowen and C. F. Schnuck,
by
Attorney.

Patented July 3, 1923.

1,460,938

UNITED STATES PATENT OFFICE.

DAVID R. BOWEN AND CARL F. SCHNUCK, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

METHOD OF MIXING OR MASTICATING HEAVY PLASTIC MATERIAL.

Original application filed September 14, 1917, Serial No. 191,413. Divided and this application filed March 20, 1918. Serial No. 223,537. Renewed March 12, 1923.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Methods of Mixing or Masticating Heavy Plastic Material, of which the following is a full, clear, and exact description.

This application is a division of our application, Serial No. 191,413, relating to a machine for treating rubber and similar material.

The present invention has particular reference to an improved method of mixing or masticating rubber which is to be used for various industrial purposes. Our improved method is particularly adapted to the mixing of rubber in the form of fairly large chunks, with filling or coloring material such as lamp black or the like, in a powdered state.

One of the primary objects of the invention is to provide an improved method for reducing to a smooth, uniform, plastic mass a mixture of the character described.

Another object of our invention is to provide a method of mixing rubber, in which the mixing action is produced by extrusion of the mass under treatment. This has been found very efficacious in producing a homogeneous mixture in a very short space of time.

Still another object of our invention is to provide a method of masticating rubber, in which the extrusion action can be carried out very conveniently, and wherein the mass can be worked very thoroughly by a mashing or smearing action, as well as by extrusion.

To these and other ends, the invention consists in the novel steps and combinations of steps to be hereinafter described and claimed.

Reference is to be had to the accompanying drawings, wherein.

Figure 1:
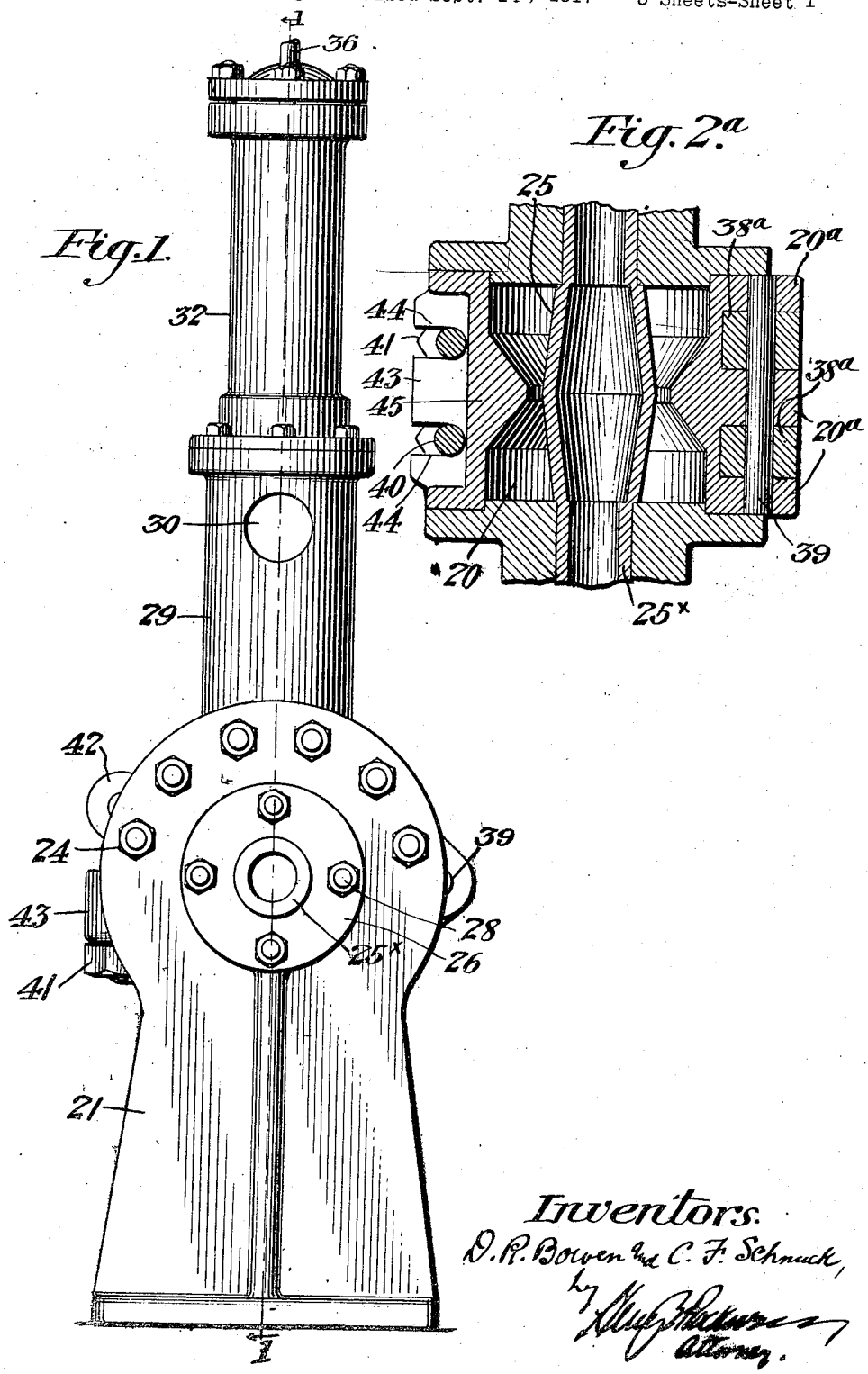
Fig. 1 is an end elevation of a rubber mixer for carrying out our improved method.
Figure 2:
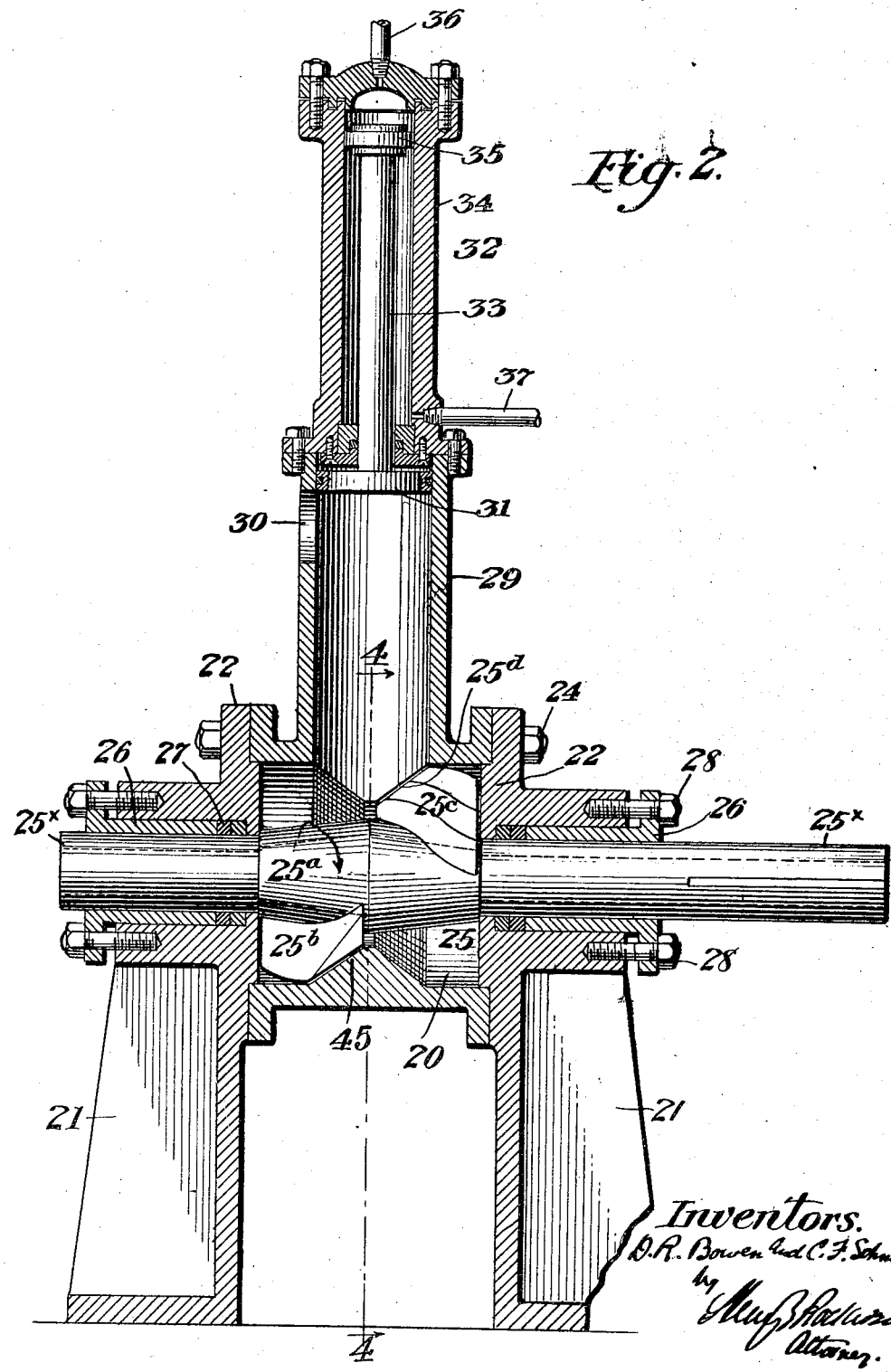
Fig. 2 is a vertical, longitudinal section with the mixing chamber closed and the pressure plunger in the raised position.

Fig. 2^A is a horizontal section through the body portion of the machine, taken on line 2^A—2^A of Fig. 4;

Fig. 3 is an end elevation of a portion of the machine with one of the end frames omitted;

Fig. 4 is a section on line 4—4 of Fig. 2;

Fig. 5 is a transverse, vertical section of the machine, showing the mixing chamber opened for the discharge of the mixed material, and the pressure plunger in its lowermost position;

Fig. 6 is a detail side elevation of the rotor;

Fig. 7 is a detail end elevation of the rotor;

Fig. 8 is an end elevation of the rotor, partly in transverse section, through one of the blades; and Figs. 9, 10 and 11 are diagrammatic plan views of the rotor and mixing chamber, showing different stages in the opeartion of the blades.

In carrying out our improved method, we prefer to employ a machine of the kind shown in the drawings, but it will be obvious that the construction of the machine may be considerably varied without departing from the scope of the present invention. The particular machine selected for illustration is characterized by a generally cylindrical mixing chamber which is adapted to be supported above the floor level and in which there is journalled a single, approximately central mixing element or rotor adapted to be driven by power applied to the rotor shaft. This machine is intended to be charged at the top and discharged at the bottom, for which purpose the mixing chamber is provided at its upper portion with a stack or chute into which the material to be treated is charged, said stack or chute being provided interiorly with a fluid pressure operated plunger or ram for forcing the material down into the mixing chamber against the rotor, while the lower part of the mixing chamber is movably mounted to permit the discharge of the mixed material when the operation has been completed.

In the example illustrated, a mixing chamber 20 of generally cylindrical shape is mounted between suitable standards, pedestals or end frames 21, having heads 22 which close the cylinder at the respective ends.

The end frames and the body portion of the cylinder may be conveniently interconnected by bolts 24. A rotary mixing element or rotor 25 is provided within the mixing chamber and has a horizontal shaft 25ˣ with bearings in the respective end frames, that portion of the shaft within the cylinder being provided with one or more blades for masticating or kneading the material, as hereinafter described. The bearings for the rotor shaft 25ˣ may be conveniently formed in adjustable stuffing box glands 26 located in the respective end frames at the ends of the cylinder, and preferably made of brass or other suitable bearing metal. The stuffing boxes with which the glands 26 are associated are adapted to prevent escape from the ends of the cylinder around the shaft of the material being treated, and they comprise one or more rings 27 of suitable packing or the like, fitted in a recess around the shaft and compressed by the corresponding gland which is adjustable by means of bolts 28. In the example shown, the shaft 25ˣ is adapted to be rotated in the direction of the arrow (Fig. 2) by power applied to a pulley (not shown) on one end of the shaft.

At the upper portion of the mixing chamber, the same is provided with an upright stack, or chute 29, which may be conveniently cast integral with the main body portion of the cylinder. Near the upper end of the stack or chute is a charging opening 30 through which material to be treated is introduced, and operating in the stack is a charging device in the form of a pressure plunger 31, movable up and down by a fluid pressure cylinder and piston device 32, supported on top of the stack. The plunger 31 has a rod 33 extending upward into the cylinder 34, and on the rod 33 is a piston 35. In the particular example shown, the plunger 31 is hydraulically operated, for which purpose a water connection 36 is provided at the top of the cylinder 34 above piston 35, while a second water connection 37 is provided at the lower part of the cylinder. The connections 36, 37 are controlled by valves in an obvious manner, so as to produce the upward and downward movement of the pressure plunger 31, in a manner which is well understood. When the material to be treated has been introduced into the mixing chamber through the opening in the stack, the pressure plunger 31 is forced down so as to push the mass forcibly into the mixing chamber, and hold it in contact with the rotating blade or blades therein, whereby such material is effectively acted upon by such blade or blades. When the mixing or masticating operation has been completed, the machine is discharged by moving the lower part of the mixing chamber relatively to the upper part in such a manner that an opening is presented for the discharge of the material, usually in a downward direction. For this purpose the machine shown in the drawing has the entire lower portion 38 of chamber 20 arranged so that it can be moved downward to open the lower part of the machine, and the movable wall portion 38 of the chamber is preferably hinged at one side of the chamber, as shown at 39, so that it can swing downward into the discharging position shown in Fig. 5. In the particular example illustrated, the lower movable section 38 comprises approximately half of the main mixing chamber wall, said mixing chamber being divided longitudinally and diametrically, but, of course, this is not essential in all cases. Furthermore, the method of hinging the movable section 38 and the means for locking it in place may vary considerably as called for by different conditions. In the case under discussion, the hinge connection 39 consists of a pintle which passes through alternately arranged knuckles on the main body of the chamber wall and on the movable part 38. In Fig. 2ᴬ, it will be observed that the knuckles of the main or body portion of the chamber wall are indicated at 20ᵃ, while the knuckles of part 38 are designated 38ᵃ. At the opposite side of the mixing chamber, swinging locking bolts 40 having nuts 41 are pivoted to lugs 42 on the body portion of the chamber, so as to hang down therefrom, and the nuts 41 are adapted to engage the under surface of a lateral slotted lug or flange 43 at the free edge of the hinged section 38 to clamp the two sections of the casing or chamber together. The lug 43 is provided with slots 44 into which the bolts 40 are adapted to swing, as shown more particularly in Fig. 2ᴬ. By screwing up the nuts 41, the machined meeting edges of the casing or chamber sections may be forced into tight contact to prevent effectively the escape of any of the treated material at the joint between the sections.

The rotor 25 shown in the drawing is provided with a blade or blades which not only have an affective wedging or mashing action to wedge or mash the material against the wall of the chamber, but also have a sort of extruding action in forcing the material (usually in a generally longitudinal direction) through one or more constricted portions of the chamber which is available for holding the material to be treated. Preferably the available space in the mixing chamber for holding the rubber will be most constricted at an intermediate point in the cylinder length, and the rotor will have blades at opposite ends of the chamber which force the rubber through the constricted portion, first in one direction, generally lengthwise of the cylinder, and then in the opposite direction, so that the mass of rubber is worked alternately from one end of the mixing chamber to the other; although in some aspects of the invention all these features are not essential. In the preferred form, however, the constriction of the mixing chamber is intermediate of the ends and the blades are so arranged that after one blade has forced or extruded the material through the constricted portion into one end of the cylinder, another blade located at that end then takes up the work and ejects the material from said end of the cylinder back into that end in which it was initially located, and so on, the working action of the blades on the material being substantially continuous. By preference, also, the constriction of the material-holding space of the mixing chamber will be provided by a transverse rib or similar constriction formed on or associated with the generally cylindrical wall of the chamber.

In the example shown, the rotor is provided within the mixing chamber with an enlargement or hub 25$^a$, on which two blades 25$^b$ are provided, one of said blades being located in one end of the mixing chamber and the other in the opposite end. These blades, moreover, are located approximately diametrically with respect to the shaft axis, as shown, for example, in Fig. 7. In this particular example, each blade extends approximately throughout one half of the mixing chamber length, and both blades cooperate with a transverse rib or ridge 45 on the chamber wall located intermediate of the ends of the chamber. As illustrated, this rib is continuous except for the interruption at the upper part where the stack 29 communicates with the upper part of the chamber and the blades 25$^b$ are so shaped as to cooperate with the rib 45 in producing an extrusion of the rubber from one end portion of the chamber to the other and back again. The blades 25$^b$ are provided with faceted working faces 25$^c$, which effectively grip the material and force it against the cylindrical wall of the mixing chamber as the rotor rotates, while at the same time the material is forced lengthwise of the chamber by inclining the blades relatively to the shaft axis. Referring particularly to Fig. 2, it will be observed that when the rotor is rotated in the direction of the arrow, the faceted working surfaces 25$^c$ of the blades will have a wedging and mashing action on the material which is forced thereby into contact with the cylindrical wall of the chamber, while at the same time the inclination of the blades relatively to the axis of the rotor causes the upper blade, shown in Fig. 2, to work the material toward the left, while the lower blade forces the material to the right. This movement of the material lengthwise of the chamber necessitates its passage through the constricted portion of the chamber provided or created by the transverse rib 45, and the blades are cut away at their inner portions so as to pass close to the rib and conform substantially thereto, and thereby cause an especially effective extruding action of the material from the space between the blade and the rib into the comparatively large open space in the other end of the chamber. Thus it will be understood that each blade not only smears or mashes the rubber against the cylindrical part of the chamber wall, but it also forces, smears or mashes it against the rib 45 in a direction transverse to the rib, said rib being preferably provided with flat, inclined sides over which the material travels inwardly and longitudinally of the cylinder, although the cross-section of the rib may be considerably varied in some cases. In each end of the cylinder, the material is subjected to a maximum amount of working or mastication so that, for example, a mixture of rubber in the form of large chunks with filling or coloring material in powdered form can be reduced in a short time to a smooth plastic mass in which the distribution of the various ingredients is uniform throughout. After being worked in one end of the cylinder, the material is forced into the other end, where it is worked again, and it is then forced back into the first end, this operation being repeated indefinitely until the desired results have been obtained.

During this operation, the material is held against the rotor by the pressure plunger or follower 31, and the temperature of the material can be controlled to a certain extent by means of water, steam or other fluid introduced into the mixing chamber wall and the interior of the rotor, which may be made hollow for this purpose. In the present case, we have shown a hollow rotor but we have not considered it necessary to illustrate a jacketed chamber as this in itself is a well-known feature.

The mixing or masticating operation having been completed, the machine is discharged by opening the lower part of the mixing chamber, as shown in Fig. 5. The rotation of the rotor is continued until all of the material has been stripped off of the same. In this operation, the main or body portion of the mixing chamber acts in the nature of a stripper, that portion of the rib carried by said body portion being especially effective in this regard. When all of the treated material has been stripped off and discharged, the mixing chamber is again closed, and the pressure plunger is raised preliminary to operation on another batch of material.

In the particular form shown, the rotor hub is enlarged at the middle portion, being formed, in effect of two cone frustums with their bases together. The blades 25ᶜ are bevelled off at their inner portions to conform to the rib as shown at 25ᵈ, and their inner ends are located closely adjacent the center of the hub and the center of the rib, so as to press the material forcibly through the narrow, arc shaped extrusion opening which is provided at that point, in a direction which is generally lengthwise of the chamber. The outer end portions of the blades are of the full depth, so that their outer edges rotate in close proximity to the cylindrical wall of the chamber, while the edges at the extreme outer ends of the blades rotate in close proximity to the end walls of the chamber. By this construction, the material is effectively smeared or scraped along the walls of the chamber and carried lengthwise of the chamber from one end to the other without the formation of any pockets in which inert material can collect.

The path of movement taken by the material during the mixing operation will be clear from an inspection of Figs. 9 to 11. It will be apparent that while one blade is forcing and wedging the material against one side face of the rib, and thereby extruding it through the constricted portion of the chamber, the other blade is doing the same thing at the other side face of the rib or other constriction, although, in the example shown, this occurs at a diametrically opposite point. It will be observed that the space through which the material is obliged to pass in moving from one end portion of the chamber into the other in a direction generally lengthwise of the rotor axis, is very small in comparison to the cubical contents of the whole chamber. The mass of material in the chamber has a volume considerably greater than the extrusion space so that the material is necessarily forced through said space under heavy pressure to produce a squeezing action. In the extrusion space, the material is densely packed and it is heavily squeezed to produce a continuous rearrangement of the molecules. In this manner, when rubber and powder are being mixed, the rubber mass is continually opened up so as to present new raw surfaces to absorb the powder, and the rubber and powder are mixed together very intimately and homogeneously.

Various changes may be made in the specific procedure herein described, without departing from the broad principles of our invention as defined in the claims.

It will be obvious that we do not limit ourselves in all aspects of the invention to a method in which a smearing action is combined with an extruding action, for in some cases, the smearing action can be altogether dispensed with. In the preferred practice, the extrusion is produced by forcing substantially the whole mass back and forth through an opening of very small cross-sectional area in comparison to the total volume of the mass of material being treated; but we do not limit ourselves, in all aspects of the invention, to this feature, nor to the treatment of the particular materials mentioned herein.

We do not claim herein the method of mixing rubber or similar material which comprises working the same back and forth against a substantially circumferentially continuous cylindrical mixing surface or other features claimed in our application, Serial No. 458,222.

What we claim is:

1. The method of compounding rubber, which comprises placing the material to be compounded in a suitable chamber, and extruding the mass through a constricted opening a multiplicity of times before removing the same from the chamber.

2. The method of masticating rubber or similar material, which comprises extruding the material through a constricted opening under heavy pressure in opposite directions.

3. The method of mixing rubber with coloring matter or the like, which comprises extruding the material through a single constricted opening under heavy pressure alternately in opposite directions.

4. The method of compounding rubber, which comprises placing a mass of material in a suitable chamber, and extruding the mass through a constricted opening, preliminary to its discharge from the chamber.

5. The method of mixing rubber with filling or coloring material, which comprises placing the mixture in a suitable chamber, mashing or smearing the same against the chamber wall, forcing it one or more times through a constricted opening, and then discharging the mixture from the chamber.

6. The method of mixing rubber chunks with filling or coloring material in powdered form, which comprises extruding the preliminary mixture through a constricted opening in opposite directions a multiplicity of times.

7. The method of masticating rubber or similar material, which comprises placing the batch within a suitable chamber, then extruding it under heavy pressure through an appropriate extrusion space within the chamber, until the mass has the desired plasticity and homogeneity, and then discharging the mass from the chamber.

8. The method of mixing rubber chunks with powdered filling or coloring material, which comprises extruding the mass of rubber and powdered material through a constricted opening alternately in opposite directions.

9. The method of working rubber and similar material which comprises placing the mass in a suitable chamber, smearing or mashing a portion of the material of the mass against the chamber wall, simultaneously extruding another portion of the material through a constricted opening, and then discharging the mass from the chamber.

10. The method of working rubber, which comprises placing a batch of rubber chunks in a suitable chamber and extruding the material while within the chamber through a constricted opening for converting it into a plastic, homogeneous mass.

11. The method of mixing heavy plastic material, which comprises placing the mass in a suitable chamber, extruding it one or more times through a restricted opening at a point intermediate the chamber ends and then discharging the mass from the chamber.

12. The method of masticating rubber or similar material which comprises introducing the material into a suitable chamber and subjecting the mass to a mixing extrusion action for thoroughly masticating the mass within the chamber.

13. The method of mixing heavy plastic material having two or more ingredients, which comprises the continued and repeated extrusion of the mass under heavy pressure through a single constricted opening alternately in opposite directions.

14. The method of mixing heavy plastic material having two or more ingredients, which comprises the continued and repeated extrusion of the mass through a constricted opening alternately in opposite directions, combined with the simultaneous mashing or smearing of a portion of the mass against a suitable surface.

15. The method of masticating rubber and similar material, which comprises introducing the material into a suitable chamber and subjecting the mass in the chamber to a repeated mixing extrusion action within the chamber.

16. The method of mixing powder with rubber or a similar substance, which comprises squeezing substantially the whole mass of rubber and powder through an opening of such constricted cross-section as to produce an extrusion and mixing with a thorough rearrangement of the molecules.

17. The method of mixing powder with rubber or a similar substance, which comprises squeezing substantially the whole mass of rubber and powder through an opening of such constricted cross-section as to produce an extrusion and mixing with a thorough rearrangement of the molecules, and repeating the extrusion of the mass a multiplicity of times.

18. The method of masticating heavy plastic material, which comprises forcing the mass through an opening of such restricted cross-sectional area relatively to the volume of the mass as to produce an extrusion action, with a consequent rearrangement of the molecules, and then forcing the mass through such opening in the opposite direction to repeat the extrusion thereof.

19. The method of masticating or working heavy plastic material, which comprises placing the same in a suitable chamber, and squeezing it through a constricted opening from one end of the chamber to the other and back again.

In witness whereof, we have hereunto set our hands on the 18th day of March, 1918.

DAVID R. BOWEN.
CARL F. SCHNUCK.